United States Patent
Zhang

(10) Patent No.: US 8,860,740 B2
(45) Date of Patent: Oct. 14, 2014

(54) METHOD AND APPARATUS FOR PROCESSING A DISPLAY DRIVER IN VIRTURE DESKTOP INFRASTRUCTURE

(71) Applicant: Huawei Technologies Co., Ltd., Shenzhen Guangdong (CN)

(72) Inventor: Hao Zhang, Santa Clara, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/709,946

(22) Filed: Dec. 10, 2012

(65) Prior Publication Data

US 2013/0100151 A1    Apr. 25, 2013

Related U.S. Application Data

(63) Continuation of application No. PCT/CN2011/078343, filed on Aug. 12, 2011.

(30) Foreign Application Priority Data

Dec. 27, 2010   (CN) .......................... 2010 1 0613977

(51) Int. Cl.
   *G06T 1/60*       (2006.01)
   *G09G 5/00*       (2006.01)
   *H04L 29/08*      (2006.01)
(52) U.S. Cl.
   CPC .................................... *G09G 5/001* (2013.01); *H04L 69/32* (2013.01)
   USPC ........................................................ 345/543
(58) Field of Classification Search
   USPC ........................................................ 345/543
   See application file for complete search history.

(56) References Cited

U.S. PATENT DOCUMENTS

2006/0282855 A1* 12/2006 Margulis .......................... 725/43
2007/0052715 A1    3/2007 Levit-Gurevich et al.

(Continued)

FOREIGN PATENT DOCUMENTS

CN    101154166 A    4/2008
CN    101187880 A    5/2008

(Continued)

OTHER PUBLICATIONS

1st Office Action in corresponding Chinese Patent Application No. 201010613977.2 (Jun. 29, 2012).

(Continued)

*Primary Examiner* — Kee M Tung
*Assistant Examiner* — Ryan D McCulley
(74) *Attorney, Agent, or Firm* — Leydig, Voit & mayer, Ltd.

(57) ABSTRACT

A computing machine includes a virtual machine monitor and a display adapter. The virtual machine monitor receives a graphics device interface (GDI) instruction including display content information and virtual machine identification information from a virtual machine, obtains video memory identification information by querying a correspondence between the virtual machine identification information and the video memory identification information, and sends a display driver message including the display content information and the video memory identification information to the display adapter. The display adapter receives the display driver message, stores the display content information in a video memory in the display adapter according to the video memory identification information, and sends the display driver message to a client terminal via a network interface card in the display adapter.

5 Claims, 5 Drawing Sheets

(56) References Cited

U.S. PATENT DOCUMENTS

| | | |
|---|---|---|
| 2007/0124474 A1 | 5/2007 | Margulis |
| 2008/0183841 A1 | 7/2008 | Isokawa et al. |
| 2008/0215770 A1 | 9/2008 | Liu et al. |
| 2010/0013839 A1* | 1/2010 | Rawson .................... 345/502 |
| 2010/0057841 A1 | 3/2010 | Morard |

FOREIGN PATENT DOCUMENTS

| | | |
|---|---|---|
| CN | 101241445 A | 8/2008 |
| CN | 101553795 A | 10/2009 |
| CN | 102097080 A | 6/2011 |
| JP | 2008186322 A | 8/2008 |

OTHER PUBLICATIONS

Chinese Search Report in corresponding Chinese Patent Application No. 2010106139772 (Jun. 18, 2012).

International Search Report in corresponding PCT Patent Application No. PCT/CN2011/078343 (Nov. 17, 2011).

$2^{nd}$ Office Action in corresponding Chinese Patent Application No. 201010613977.2 (Mar. 8, 2013).

* cited by examiner

METHOD AND APPARATUS FOR PROCESSING A DISPLAY DRIVER IN VIRTURE DESKTOP INFRASTRUCTURE

CROSS-REFERENCE TO RELATED APPLICATIONS

This application is a continuation of International Patent Application No. PCT/CN2011/078343, filed Aug. 12, 2011, which claims priority to Chinese Patent Application No. 201010613977.2, filed on Dec. 27, 2010, both of which are incorporated herein by reference in their entireties.

FIELD

Embodiments of the present invention relate to the field of communications, and in particular, to a display driver processing method, device and system.

BACKGROUND

A virtual desktop infrastructure (VDI) may deploy a computer in a centralized data center, and then connect and map remote peripherals such as a display, a mouse and a keyboard to a centralized deployment computer through a remote desktop protocol, thereby achieving centralized maintenance and information security.

In the prior art, a remote computer in the VDI may draft in a display apparatus through calling a graphics device interface (GDI). FIG. 1 is a schematic architectural diagram of the VDI in the prior art. As shown in FIG. 1, an application program may send a GDI instruction to a display driver program, and then the display driver program may send the GDI instruction to the display apparatus for drafting. In a VDI scenario, a remote desktop protocol driver program may also be installed which may capture all the GDI instructions and send the GDI instructions to a remote thin client (TC) through a network protocol such as a transmission control protocol (TCP), and after the TC receives the instructions, the TC may convert the GDI instructions of the remote computer into GDI instructions of a local operation system to redisplay a desktop of the remote computer in local environment. In a virtualized scenario, the remote computer may virtualize many virtual machines, and then the TC may access the virtual machines through the desktop protocol.

However, GDI instructions of the virtual machines are processed by a CPU, and therefore the processing of the GDI instructions consumes CPU resources, and when the resolution of the virtual machines is high, the consumption of the memory of a physical machine is high.

SUMMARY

Embodiments of the present invention provide a display driver processing method, device and system.

An embodiment of the present invention provides a display driver processing method in a virtual desktop infrastructure, which includes:

receiving, by a display adapter, a display driver message including display content information and video memory identification information, from a virtual machine monitor, wherein the display content information is obtained from a graphics device interface (GDI) instruction received by the virtual machine monitor from a virtual machine, and the video memory identification information corresponds to virtual machine identification information of the virtual machine included in the GDI instruction and identifies a video memory in the display adapter; and storing, by the display adapter, the display content information in the video memory in the display adapter according to the video memory identification information; and sending, by the display adapter, the display driver message to a client terminal via a network interface card in the display adapter.

An embodiment of the present invention provides a display adapter, which includes:

a receiver, configured to receive a display driver message including display content information and video memory identification information from a virtual machine monitor, wherein the display content information is obtained from a graphics device interface (GDI) instruction received by the virtual machine monitor from a virtual machine, and the video memory identification information corresponds to virtual machine identification information of the virtual machine included in the GDI instruction;

a plurality of video memories, wherein one of the plurality of video memories which is identified by the video memory identification information is configured to store the display content information under control of a display chip in the display adapter; and a network interface card which is controlled by the display chip, configured to send the display driver message to a client terminal.

An embodiment of the present invention provides a display driver processing method in a virtual desktop infrastructure, which includes:

receiving, by a virtual machine monitor, a graphics device interface (GDI) instruction including display content information and virtual machine identification information, from a virtual machine managed by the virtual machine monitor, wherein the virtual machine identification information identifies the virtual machine;

obtaining, by the virtual machine monitor, video memory identification information by querying a correspondence between the video memory identification information and the virtual machine identification information;

constructing, by the virtual machine monitor, a display driver message including the display content information and the video memory identification information; and sending the display driver message to a display adapter including a video memory which is identified by the video memory identification information and configured to store the display content information according to the video memory identification information.

An embodiment of the present invention provides a virtual machine monitor, which includes:

a receiving module, configured to receive a graphics device interface (GDI) instruction sent by a virtual machine managed by the virtual machine monitor, wherein the GDI instruction includes display content information and virtual machine identification information identifying the virtual machine;

an obtaining module, configured to obtain video memory identification information corresponding to the virtual machine identification information by querying a correspondence between the virtual machine identification information and the video memory identification information; and a sending module, configured to send a display driver message including the display content information and the video memory identification information, to a display adapter including a video memory which is identified by the video identification and configured to store the display content information.

An embodiment of the present invention also provides a computing machine in which a virtual machine monitor is operated, the computing machine comprising a display adapter communicating with the virtual machine monitor. The virtual machine monitor is configured to: receive a graphics device interface (GDI) instruction from a virtual machine managed by the virtual machine monitor, the GDI instruction comprising display content information and virtual machine identification information which identifies the virtual machine; obtain video memory identification information by querying a correspondence between the virtual machine identification information and the video memory identification information; and send a display driver message including the display content information and the video memory identification information to the display adapter. The display adapter is configured to: receive the display driver message from the virtual machine monitor; store the display content information in a video memory in the display adapter according to the video memory identification information; and send the display driver message to a client terminal via a network interface card in the display adapter.

In some embodiments of the present invention, multiple virtual machines may share a physical display adapter, and use the physical display adapter to process the first display driver message, so as to avoid the consumption of a CPU of a physical machine. This may increase the display speed. Furthermore, because the content required to be displayed is stored in the video memory of the physical display adapter rather than the memory of the physical machine, the consumption of the memory of the physical machine is reduced, and the display processing speed is increased.

BRIEF DESCRIPTION OF THE DRAWINGS

To illustrate the technical solutions according to the embodiments of the present invention or in the prior art more clearly, the accompanying drawings for describing the embodiments or the prior art are introduced briefly in the following. Apparently, the accompanying drawings in the following description are only about some embodiments of the present invention, and persons of ordinary skill in the art can derive other drawings from the accompanying drawings without creative efforts.

DETAILED DESCRIPTION OF THE EMBODIMENTS

In order to make the objectives, technical solutions, and advantages of the present invention more comprehensible, the technical solutions according to the embodiments of the present invention are clearly and completely described in the following with reference to the accompanying drawings. Apparently, the embodiments in the following description are merely a part rather than all of the embodiments of the present invention. All other embodiments obtained by persons of ordinary skill in the art based on the embodiments of the present invention without creative efforts shall fall within the protection scope of the present invention.

Figure 1:
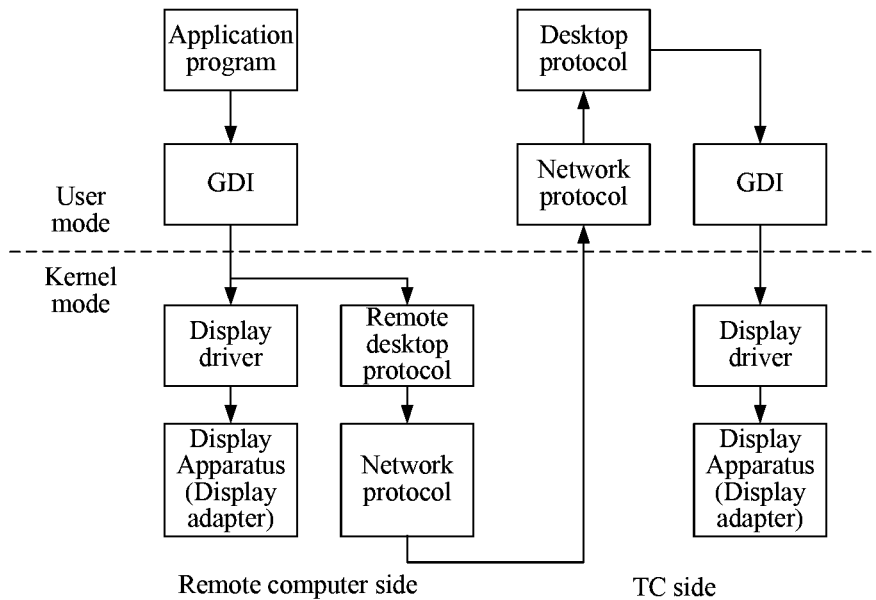
FIG. 1 is a schematic diagram of a virtual desktop infrastructure (VDI) in the prior art.
Figure 2:
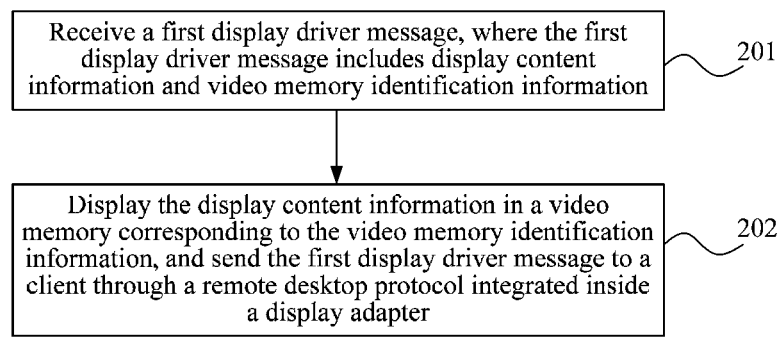
FIG. 2 is a flow chart of a display driver processing method according to an embodiment of the present invention.

FIG. 2 is a flow chart of a display driver processing method according to an embodiment of the present invention. As shown in FIG. 2, the method may include:

Step 201: Receive a first display driver message which includes display content information and video memory identification information.

Specifically, a physical display adapter may receive the first display driver message including display content information and video memory identification information. The physical display adapter may receive the first display driver message sent by a physical machine, and alternatively, the physical display adapter may receive the first display driver message sent by a virtual machine monitor (VMM).

In a non-virtual scenario, the application program of the physical machine may drive the physical display adapter, and send the first display driver message to the physical display adapter.

In a virtual scenario, a remote computer may virtualize many virtual machines each of which may correspond to one operation system (OS). An OS driver (hereinafter "OSdrv") may be installed in each operation system. In the VMM, a display driver (hereinafter "drv") may also be installed. The OSdrv is similar to the application program of the physical machine, and the drv is similar to a real display adapter driver of the physical machine. That is, the OSdrv acts as an application program to share the physical display adapter with the OSdrvs of other OSs. When a certain virtual machine needs to send a GDI instruction, for example a drafting instruction, the OS of the virtual machine may run the OSdrv to send the GDI instruction to the VMM. Because the VMM may manage each virtual machine, the VMM may learn that which virtual machine sends the GDI instruction. Because the OSdrv of the virtual machine shares the physical display adapter with the OSdrvs of other OSs, and the physical display adapter has a large amount of video memories used for storing the content displayed in a screen (for example, the size of video memory may be 1 GB, 256 MB, 512 MB or the like), the VMM may also allocate and manage a video memory in the physical display adapter available to a virtual machine, such as identifying the video memory available to the virtual machine. Therefore, after receiving the GDI instruction sent by the virtual machine, the VMM may not only learn that which virtual machine sends the GDI instruction, but also learn the video memory identification information corresponding to the virtual machine, so that the first display driver message including the display content information and the video memory identification information can be sent to the physical display adapter.

Step 202: Display the display content information in the video memory corresponding to the video memory identification information, and send the first display driver message to a client through a remote desktop protocol integrated inside the display adapter.

No matter whether the physical display adapter receives the first display driver message in a virtual scenario or in the non-virtual scenario, the physical display adapter may obtain the display content information and the video memory identification information from the first display driver message. For example, the display content information may be graphic information required to be drafted.

Specifically, the physical display adapter may display the display content information in the video memory corresponding to the video memory identification information. For example, if the virtual machine 3 needs to display a straight line, the OSdrv may send a call for drawing the straight line, and the VMM may call the drv to draw the straight line to the video memory of the desktop 3 corresponding to the virtual machine 3.

In addition, in this embodiment, a remote desktop protocol is also integrated inside the physical display adapter, and the remote desktop protocol may capture the first display driver message in the physical display adapter, and send the first display driver message to a client, for example a TC, through a network protocol, such as a TCP.

In this embodiment, the video memory corresponding to the virtual machine is managed by a real display driver (drv) installed in the VMM. The capability of the OSdrv is consistent with the capability of the drv, and therefore the OSdrv may call a hardware acceleration capability of the physical display adapter, such as drawing a straight line, drawing a rectangle, and drafting a text, video, and 3D, so that multiple virtual machines may access the physical display adapter in a same way as a conventional physical machine, and obtain the hardware acceleration capability of the physical display adapter.

In this embodiment, a real display driver (drv) is installed in the VMM, and the multiple virtual machines may share the physical display adapter, and adopt the physical display adapter to process the first display driver message, so as to avoid the consumption of a CPU of a physical machine, thereby greatly increasing the display speed. Furthermore, because the content required to be displayed is stored in the video memory of the physical display adapter rather than the memory of the physical machine, the consumption of the memory of the physical machine is reduced, and the display processing speed is increased.

Figure 3:
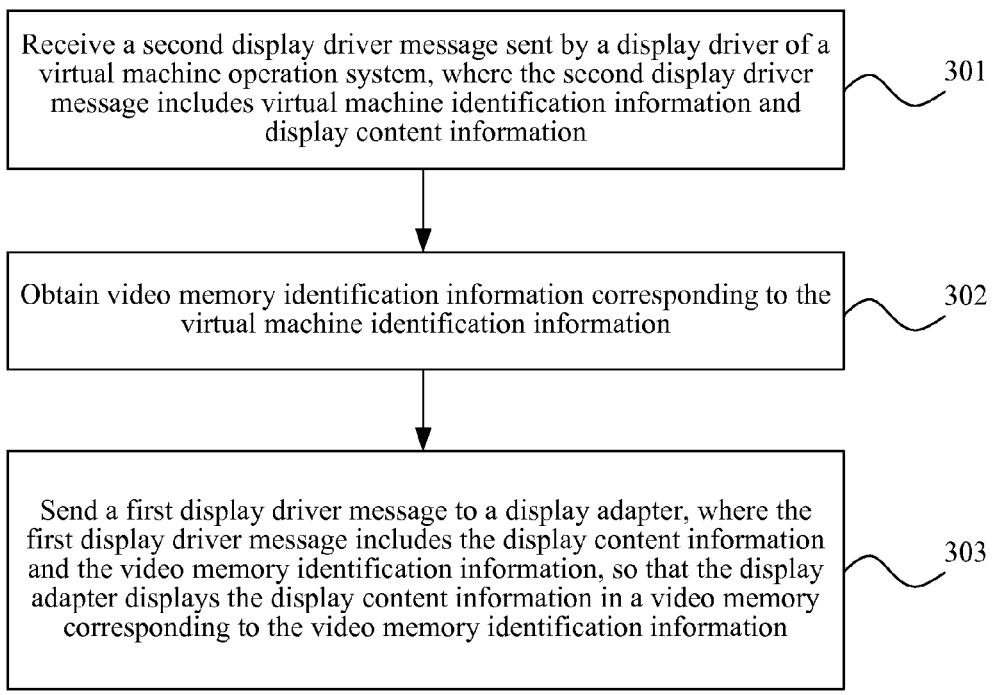
FIG. 3 is a flow chart of a display driver processing method according to an embodiment of the present invention.

FIG. 3 is a flow chart of a display driver processing method according to an embodiment of the present invention. As shown in FIG. 3, the method of this embodiment is similar to the execution process of the VMM in the embodiment shown in FIG. 2, and the method of this embodiment may include:

Step 301: Receive a second display driver message sent by a display driver of a virtual machine operation system. The second display driver message includes virtual machine identification information and display content information.

The VMM receives the second display driver message sent by an OSdrv of a virtual machine, where the second display driver message is a GDI instruction.

In this embodiment, an OSdrv may be installed in each OS. In the VMM, a drv may also be installed. The OSdrv is similar to the application program of a physical machine, and the drv is similar to the real display adapter driver of the physical machine. When a certain virtual machine needs to send a second display driver message, such as a drafting instruction, the OS of the virtual machine may run the OSdrv to send the second display driver message to the VMM. The second display driver message include display content information, such as drafting a rectangle, and may also include virtual machine identification information, such as an ID of the virtual machine.

Step 302: Obtain video memory identification information corresponding to the virtual machine identification information.

Because the VMM may manage each virtual machine, the VMM may learn that which virtual machine sends the GDI instruction. Because the OSdrv of the virtual machine shares a physical display adapter with the OSdrvs of other OSs, and the physical display adapter has a large amount of video memories used for storing the content displayed in a screen (for example, the size of the video memory may be 1 GB, 256 MB or 512 MB), the VMM also allocate and manage a video memory in the physical display adapter available to a virtual machine. For example, in this embodiment, the VMM may store a corresponding relationship between virtual machine identification information and video memory identification information, and the VMM may learn the video memory identification information of the physical display adapter corresponding to the virtual machine identification information obtained from the second display driver message.

Step 303: Send a first display driver message to the display adapter. The first display driver message includes the display content information and the video memory identification information. Thus, the display adapter displays the display content information in a video memory corresponding to the video memory identification information.

The display adapter described in this embodiment is a physical display adapter rather than a virtual display adapter in a virtual environment. The VMM may send a first display driver message to the physical display adapter, where the first display driver message includes the same display content information as that in the second display driver message and the video memory identification information that is obtained by the VMM according to the virtual machine identification information in the second display driver message. Therefore, the physical display adapter may display the display content information, which is in the first display driver message, in the video memory corresponding to the video memory identification information.

In this embodiment, the video memory corresponding to the virtual machine is managed by a real display driver (drv) installed in the VMM. The capability of the OSdrv is consistent with the capability of the drv, and therefore under the call of the OSdrv, the VMM may drive a hardware acceleration capability of the physical display adapter, such as drawing a straight line, drawing a rectangle, and drafting a text, video, and 3D, so that multiple virtual machines may access the physical display adapter in a same way as a conventional physical machine and obtain the hardware acceleration capability of the physical display adapter.

Figure 4:
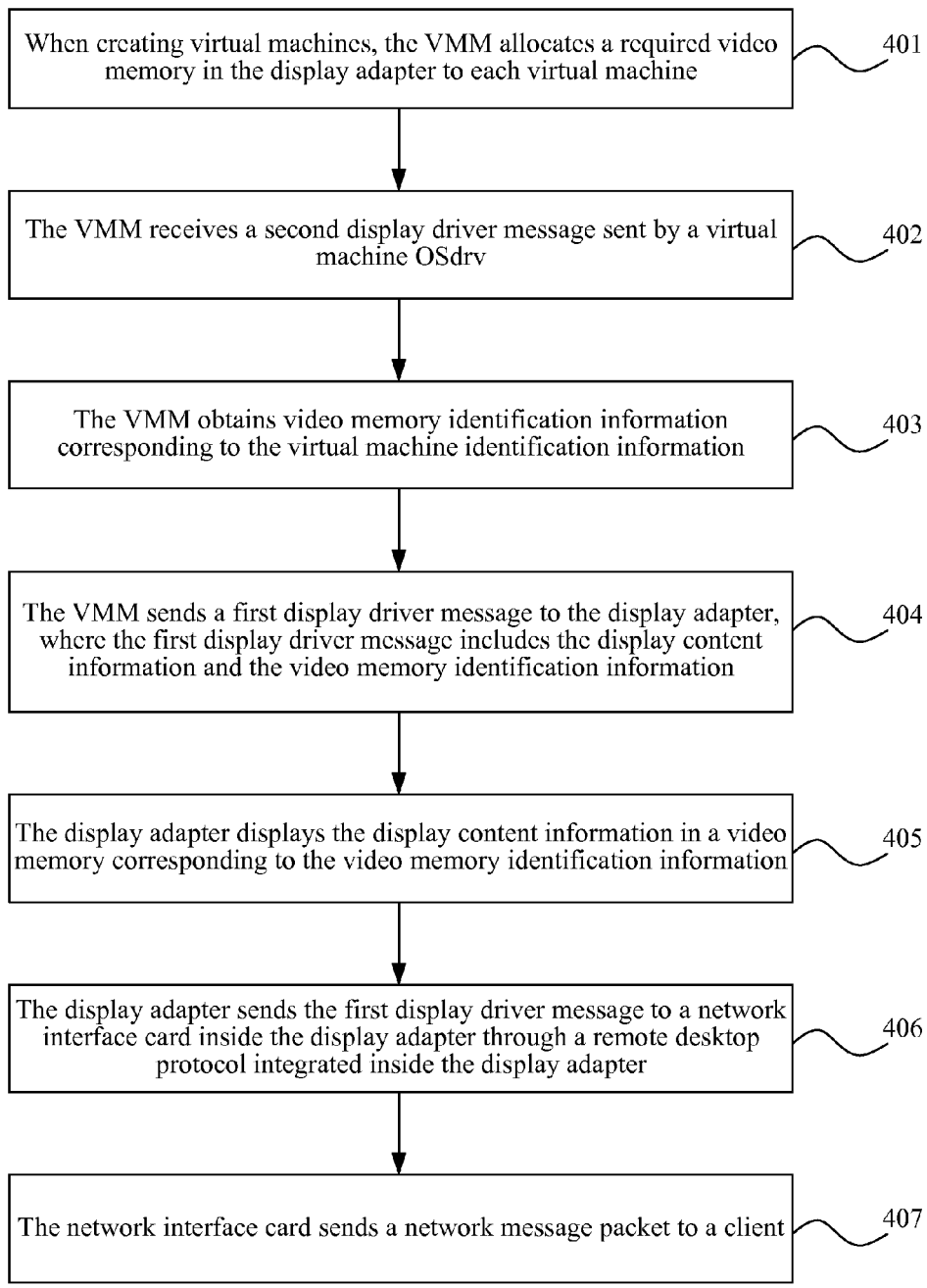
FIG. 4 is a flow chart of a display driver processing method according to an embodiment of the present invention.
Figure 5:
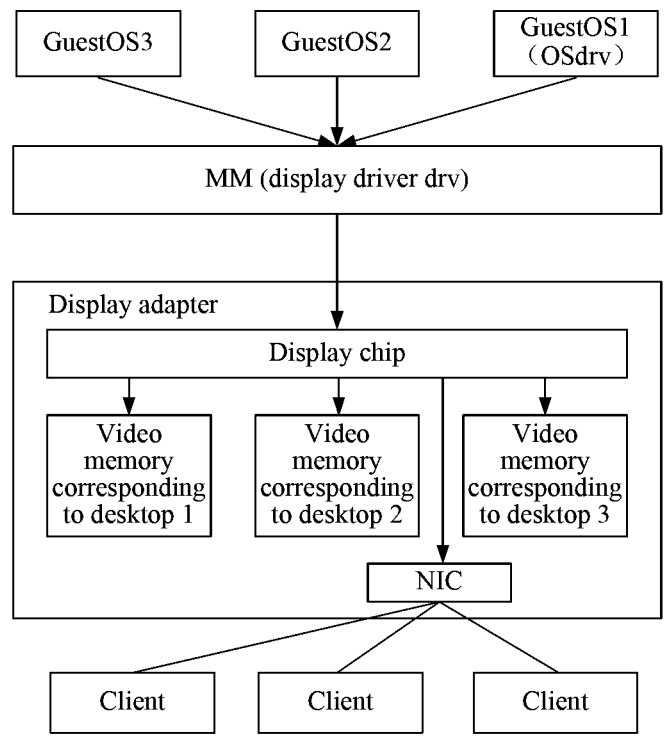
FIG. 5 is a schematic diagram of a system applied in the method shown in FIG. 4.

FIG. 4 is a flow chart of a display driver processing method according to an embodiment of the present invention, and FIG. 5 is a schematic diagram of a system applied in the method embodiment shown in FIG. 4. As shown in FIG. 4 and FIG. 5, the system applied in this embodiment may include: three virtual machines (namely, GuestOS 1, GuestOS 2 and GuestOS 3), a VMM and a physical display adapter. The physical display adapter has a display chip, the video memories of the physical display adapter include the video memory corresponding to the desktop 1, the video memory corresponding to the desktop 2 and the video memory corresponding to the desktop 3. The content required to be displayed for the GuestOS 1 may be displayed in the video memory corresponding to the desktop 1, the content required to be displayed for the GuestOS 2 may be displayed in the video memory corresponding to the desktop 2, and the content required to be displayed for GuestOS 3 may be displayed in the video memory corresponding the desktop 3. A network interface card (NIC) is also integrated in the physical display adapter, and the display chip may directly control the NIC, which is different from the prior art where the NIC needs to be controlled through a CPU of a physical machine, thereby improving the network processing efficiency Specifically, the method of this embodiment may include:

Step 401: When creating virtual machines, the VMM allocates a video memory in the display adapter to each virtual machine.

When creating the virtual machines, the VMM may notify the drv of the size of a video memory required by each virtual machine, so that the drv may apply for the video memory of the size from the video memories of the physical display adapter to serve as the video memory of the virtual machine. For example, the size of the video memory required by each of the GuestOS 1, the GuestOS 2 and the GuestOS 3 is 16 MB, and accordingly the drv of the VMM may apply for a video memory of 16 MB for each of the GuestOS 1, the GuestOS 2 and the GuestOS 3. Persons skilled in the art may understand that, the drv of the VMM may also apply for video memories of different sizes for the GuestOS 1, the GuestOS 2 and the GuestOS 3. The VMM may assign corresponding video memory identification information to the video memories of the GuestOS 1, the GuestOS 2 and the GuestOS 3. Optionally, the VMM may form a corresponding relationship between virtual machine identification information and video memory identification information.

Step 402: The VMM receives a second display driver message sent by an OSdrv of a virtual machine.

For example, the OSdrv of the GuestOS 1 may send a second display driver message to the VMM. The second display driver message includes virtual machine identification information and display content information. The display content information may be a line drawing instruction Line (x1, y1, x2, y2), that is, a straight line from (x1, y1) to (x2, y2) needs to be drawn. The virtual machine identification information may be ID information of the GuestOS 1, and this embodiment does not limit the specific form of the virtual machine identification information.

Step 403: The VMM obtains video memory identification information corresponding to the virtual machine identification information.

The VMM may manage and maintain the corresponding relationship between virtual machine identification information and video memory identification information, so that after receiving the second display driver message, the VMM may obtain the video memory identification information corresponding to the virtual machine identification information by querying the corresponding relationship. In this embodiment, the VMM may obtain the video memory identification information of the GuestOS 1.

Step 404: The VMM sends a first display driver message to the display adapter, where the first display driver message includes the display content information and the video memory identification information.

Step 405: The display adapter displays the display content information in a video memory corresponding to the video memory identification information.

The implementation principle of step 404 and step 405 is similar to that of step 201 and step 202 shown in FIG. 2, so that the details will not be described herein again.

Step 406: The display adapter sends the first display driver message to a network interface card inside the display adapter through a remote desktop protocol integrated inside the display adapter.

Step 407: The network interface card sends a network message packet to a client.

In the prior art, a CPU controls the NIC through a south bridge chip, and therefore, in a conventional physical machine, the display adapter cannot control the NIC. However, due to scheduling of the CPU by the VMM, a delay exists in the transmission of the network packet. In this embodiment, the NIC may be integrated inside the physical display adapter. After the display adapter receives the first display driver message, the remote desktop protocol may capture the first display driver message, and send the first display driver message to the NIC, so that the first display driver message may be directly sent to the client through the NIC, and does not need to be sent through a virtual CPU of a Guest OS, thereby reducing the transmission delay of the first display driver message.

In the foregoing step 406, the display adapter may also pack at least two first display driver messages into a network message packet, and then send the network message packet to the client through the NIC.

Specifically, because a second display driver message sent by each virtual machine is processed inside the same display adapter, the display adapter may pack GDI instructions of multiple GuestOSs into one network message packet, and send the network message packet to the client through the NIC. A gateway apparatus may be disposed at a client side such as a TC side, and the gateway apparatus may unpack the network message packet and forward the network message packet to different TCs. The process may greatly improve the use efficiency of a network and reduce the transmission delay of the network.

In this embodiment, the video memory corresponding to the virtual machine is managed by a real display driver (drv) installed in the VMM. The capability of the OSdrv is consistent with the capability of the drv, and therefore the OSdrv may call a hardware acceleration capability of the physical display adapter, so that multiple virtual machines may access the physical display adapter in a way same as a conventional physical machine and obtain the hardware acceleration capability. By driving the physical display adapter to process the GDI instruction in the VMM, the consumption of the CPU of the physical machine is avoided during the GDI processing, thereby increasing the display speed. Furthermore, because the content required to be displayed is stored in the video memory of the physical display adapter rather than the memory of the physical machine, the consumption of the memory of the physical machine is reduced, and the display processing speed is increased. In addition, by integrating the NIC inside the display adapter, the transmission delay of the GDI instruction is reduced, and the network message packet obtained by packing multiple GDI instructions may also be sent to the client through the NIC, thereby further improving the use efficiency of the network, and reducing the transmission delay of the network.

Figure 6:
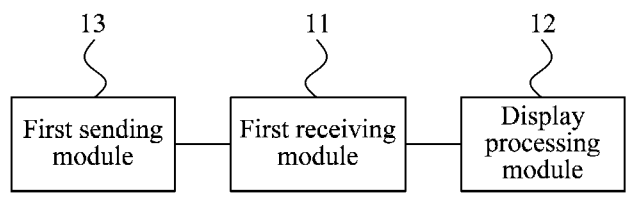
FIG. 6 is a schematic diagram of a display adapter according to an embodiment of the present invention.

FIG. 6 is a schematic diagram of a display adapter according to an embodiment of the present invention. As shown in FIG. 6, the display adapter of this embodiment may include: a first receiving module 11, a display processing module 12, and a first sending module 13. The first receiving module 11 is configured to receive a first display driver message which includes display content information and video memory identification information; the display processing module 12 is configured to display the display content information in a video memory corresponding to the video memory identification information; and the first sending module 13 is configured to send the first display driver message to a client through a remote desktop protocol integrated inside the display adapter.

The display adapter of this embodiment may be configured to execute the method shown in FIG. 2, and the implementation principle and technical effects are similar, which will not be described herein again.

Figure 7:
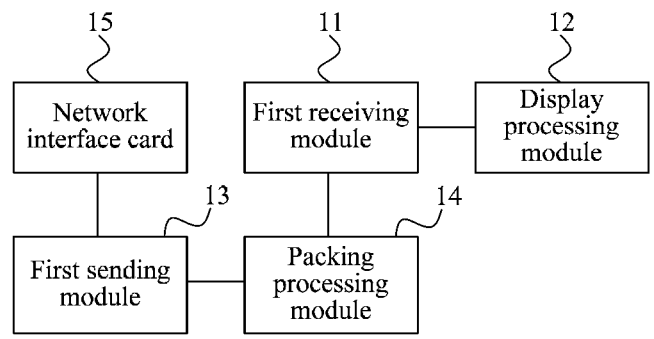
FIG. 7 is a schematic diagram of another display adapter according to an embodiment of the present invention.

FIG. 7 is a schematic diagram of a display adapter according to an embodiment of the present invention. As shown in FIG. 7, on the basis of the display adapter shown in FIG. 6, the display adapter of this embodiment further includes: a network interface card 14, a packing processing module 15. The network interface card 14 is configured to send, to the client, the first display driver message sent by the first sending module 13, the packing processing module 15 is configured to pack at least two first display driver messages into a network message packet, and the first sending module 13 is further configured to send the network message packet to a gateway apparatus of the client, so that the gateway apparatus of the client obtains the at least two first display driver messages in the network message packet and sends the at least two first display driver messages to the client, and more specifically, the first sending module 13 is configured to send the network message packet to the gateway apparatus of the client through the network interface card 14.

The display adapter of this embodiment may execute the corresponding function in the method embodiment shown in FIG. 4, and the implementation principle and technical effects are similar, which will not be described herein again.

Figure 8:
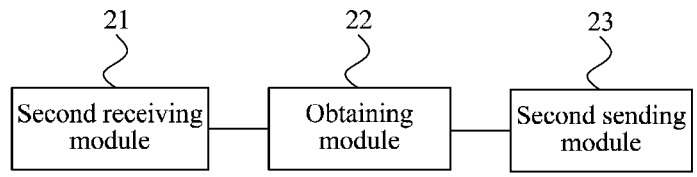
FIG. 8 is a schematic diagram of a virtual machine monitor according to an embodiment of the present invention.

FIG. 8 is a schematic diagram of a virtual machine monitor according to an embodiment of the present invention. As shown in FIG. 8, the VMM of this embodiment may include: a second receiving module 21, an obtaining module 22, and a second sending module 23. The second receiving module 21 is configured to receive a second display driver message sent by a display driver of a virtual machine operation system, where the second display driver message includes virtual machine identification information and display content information; the obtaining module 22 is configured to obtain video memory identification information corresponding to the virtual machine identification information; and the second sending module 23 is configured to send a first display driver message to a display adapter, where the first display driver message includes the display content information and the video memory identification information, so that the display adapter displays the display content information in a video memory corresponding to the video memory identification information.

The VMM of this embodiment may be configured to execute the method of the method embodiment shown in FIG. 3, and the implementation principle and technical effects are similar, which will not be described herein again.

Figure 9:
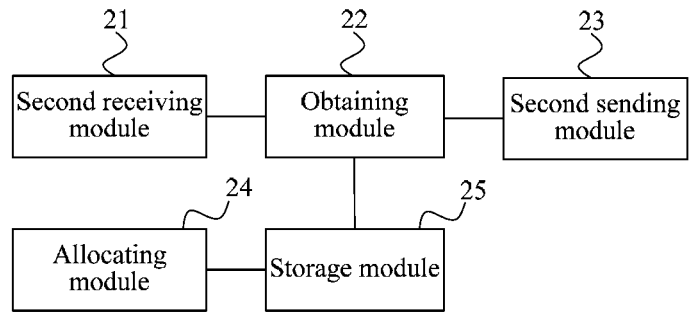
FIG. 9 is a schematic diagram of another virtual machine monitor according to an embodiment of the present invention.

FIG. 9 is a schematic diagram of a virtual machine monitor according to an embodiment of the present invention. As shown in FIG. 9, on the basis of the VMM shown in FIG. 8, the VMM of this embodiment further includes: an allocating module 24 and a storage module 25. The allocating module 24 is configured to, when virtual machines are created, allocate a required video memory in the display adapter to each virtual machine, where each video memory has corresponding video memory identification information; and the storage module 25 is configured to store a corresponding relationship between the virtual machine identification and the video memory identification information.

The VMM of this embodiment may execute the corresponding function in the method embodiment shown in FIG. 4, and the implementation principle and technical effects are similar, which will not be described herein again.

Figure 10:
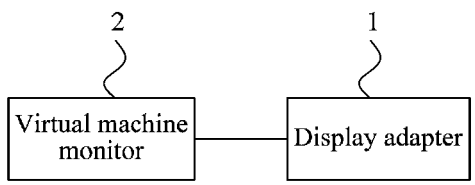
FIG. 10 is a schematic diagram of a virtual desktop system according to an embodiment of the present invention.

FIG. 10 is a schematic diagram of a virtual desktop system according to an embodiment of the present invention. As shown in FIG. 10, the system of this embodiment may include: a display adapter 1 and a virtual machine monitor 2, where the display adapter 1 may adopt the structure shown in FIG. 6 or FIG. 7, the virtual machine monitor may adopt the structure shown in FIG. 8 or FIG. 9, the process of interaction between the display adapter 1 and the virtual machine monitor 2 may be implemented by using the method shown in FIG. 4, the specific logic architectures of the display adapter 1 and the virtual machine monitor 2 may adopt the forms shown in FIG. 5, and the implementation principle and technical effects are similar, which will not be described herein again.

Persons of ordinary skill in the art should understand that, all or a part of the steps of the method according to the embodiments may be implemented by a program instructing relevant hardware. The program may be stored in a computer readable storage medium. When the program runs, the steps of the method according to the embodiments are performed. The foregoing storage medium includes any medium that is capable of storing program codes, such as a ROM, a RAM, a magnetic disk or an optical disk.

Finally, it should be noted that the foregoing embodiments are merely provided for describing the technical solutions of the present invention, but not intended to limit the present invention. It should be understood by persons of ordinary skill in the art that although the present invention has been described in detail with reference to the foregoing embodiments, modifications can be made to the technical solutions described in the foregoing embodiments, or equivalent replacements can be made to some technical features in the technical solutions, as long as such modifications or replacements do not cause the essence of corresponding technical solutions to depart from the spirit and scope of the technical solutions according to the embodiments of the present invention.

What is claimed is:

1. A display driver processing method in a virtual desktop infrastructure, comprising:

receiving, by a display adapter, a display driver message including display content information and video memory identification information, from a virtual machine monitor, wherein the display content information is obtained from a graphics device interface (GDI) instruction received by the virtual machine monitor from a virtual machine, and the video memory identification information corresponds to virtual machine identification information of the virtual machine included in the GDI instruction and identifies a video memory in the display adapter, wherein the video memory is managed by a display driver installed in the virtual machine monitor; and storing, by the display adapter, the display content information in the video memory in the display adapter according to the video memory identification information; and sending, by the display adapter, the display driver message to a client terminal via a network interface card in the display adapter, wherein the display driver message is sent to the network interface card in the display adapter through a remote desktop protocol integrated in the display adapter, and then sent to the client terminal via the network interface card.

2. The method according to claim 1, wherein the display adapter packs the display driver message and another display driver message received from the virtual machine monitor into a network message packet, and sends the network message packet to the client terminal via the network interface card.

3. A display adapter, comprising:
a receiver, configured to receive a display driver message including display content information and video memory identification information from a virtual machine monitor, wherein the display content information is obtained from a graphics device interface (GDI) instruction received by the virtual machine monitor from a virtual machine, and the video memory identification information corresponds to virtual machine identification information of the virtual machine included in the GDI instruction;
a plurality of video memories which are managed by a display driver installed in the virtual machine monitor, wherein one of the plurality of video memories which is identified by the video memory identification information is configured to store the display content information under control of a display chip in the display adapter; and
a network interface card which is controlled by the display chip, configured to send the display driver message to a client terminal, wherein a remote desktop protocol integrated in the display adapter sends the display driver message to the network interface card.

4. A computing machine in which a virtual machine monitor is operated, the computing machine comprising a display adapter communicating with the virtual machine monitor, wherein the virtual machine monitor is configured to:
receive a graphics device interface (GDI) instruction from a virtual machine managed by the virtual machine monitor, the GDI instruction comprising display content information and virtual machine identification information which identifies the virtual machine;
obtain video memory identification information by querying a correspondence between the virtual machine identification information and the video memory identification information; and
send a display driver message including the display content information and the video memory identification information to the display adapter;
wherein the display adapter is configured to:
receive the display driver message from the virtual machine monitor;
store the display content information in a video memory in the display adapter according to the video memory identification information, wherein the video memory is managed by a display driver installed in the virtual machine monitor; and
send the display driver message to a client terminal via a network interface card in the display adapter, wherein the display driver message is sent to the network interface card through a remote desktop protocol integrated in the display adapter.

5. The computing machine according to claim 4, wherein the virtual machine monitor is configured to allocate the video memory to the virtual machine.

* * * * *